(12) United States Patent
Chen et al.

(10) Patent No.: US 11,524,472 B2
(45) Date of Patent: Dec. 13, 2022

(54) METHOD OF MANUFACTURING OPTICAL COMPONENT HAVING MICRO-STRUCTURES

(71) Applicant: National Taiwan University of Science and Technology, Taipei (TW)

(72) Inventors: Chao-Chang Chen, Taipei (TW); Cheng-Fan Yu, Taipei (TW); Chang-Shun Lai, Taipei (TW); Chien-Yu Hou, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 17/160,894

(22) Filed: Jan. 28, 2021

(65) Prior Publication Data

US 2021/0146587 A1 May 20, 2021

Related U.S. Application Data

(63) Continuation-in-part of application No. 15/798,420, filed on Oct. 31, 2017, now abandoned.

(30) Foreign Application Priority Data

Jan. 6, 2017 (TW) .................. 106100470

(51) Int. Cl.
*B29D 11/00* (2006.01)
*B29C 45/73* (2006.01)
*B29C 45/56* (2006.01)

(52) U.S. Cl.
CPC ...... *B29D 11/00951* (2013.01); *B29C 45/568* (2013.01); *B29C 45/73* (2013.01); *B29D 11/00769* (2013.01); *B29C 2045/7356* (2013.01); *B29C 2945/7604* (2013.01); *B29C 2945/76006* (2013.01); *B29C 2945/76257* (2013.01)

(58) Field of Classification Search
CPC .......... B29D 11/00951; B29D 11/0074; B29D 11/00596; B29D 11/00923; B29C 45/73; B29C 45/568
See application file for complete search history.

(56) References Cited

U.S. PATENT DOCUMENTS

| 10,155,332 | B2 * | 12/2018 | Chen ..................... B29C 45/568 |
| 2004/0142057 | A1 | 7/2004 | Kao et al. |
| 2004/0150138 | A1 | 8/2004 | Hiroi et al. |
| 2006/0289293 | A1 | 12/2006 | Chen |
| 2012/0262646 | A1 * | 10/2012 | Iwata ................. G02F 1/133536 349/64 |

(Continued)

FOREIGN PATENT DOCUMENTS

| CN | 1541825 A | 11/2004 |
| CN | 1883911 A | 12/2006 |

(Continued)

*Primary Examiner* — Mathieu D Vargot
(74) *Attorney, Agent, or Firm* — JMB Davis Ben-David

(57) ABSTRACT

A method of manufacturing an optical component having micro-structures is described. The method detects a crystallization temperature within a crystallization temperature interval for fully filling the molding material into a mold cavity to rapidly produce the optical element having a micro-structure with a large area.

14 Claims, 9 Drawing Sheets

(56) References Cited

U.S. PATENT DOCUMENTS

| | | | | |
|---|---|---|---|---|
| 2013/0010366 A1* | 1/2013 | Nakamura | ......... | G02B 27/0101 |
| | | | | 359/633 |
| 2014/0065365 A1 | 3/2014 | Kang | | |
| 2014/0088285 A1* | 3/2014 | Nair | ..................... | C08G 63/605 |
| | | | | 528/192 |
| 2015/0336316 A1 | 11/2015 | Chen et al. | | |

FOREIGN PATENT DOCUMENTS

| | | | |
|---|---|---|---|
| CN | 103459127 | A | 12/2013 |
| CN | 203779793 | U | 8/2014 |
| CN | 203818383 | U | 9/2014 |
| CN | 105563751 | A | 5/2016 |
| TW | 392538 | U | 6/2000 |
| TW | 200413153 | A | 8/2004 |
| TW | 201323175 | A | 6/2013 |

* cited by examiner

METHOD OF MANUFACTURING OPTICAL COMPONENT HAVING MICRO-STRUCTURES

CROSS-REFERENCE TO RELATED APPLICATIONS

This is a continuation-in-part of U.S. patent application Ser. No. 15/798,420 filed on Oct. 31, 2017, now abandoned, which claims the benefit of Taiwan Patent Application No. 106100470 filed Jan. 6, 2017. The contents of the foregoing applications are incorporated by reference herein in their entirety.

BACKGROUND OF THE INVENTION

Field of Invention

The present invention relates to a method of manufacturing an optical component, more particularly relates to a method of manufacturing an optical component having micro-structures.

Description of Prior Art

In recent years, due to the rapid development of the semiconductor industry, electronic and medical science, and the like, so that the electronic products, such as products with optical components, are directed to light, thin, short and small of integration and miniaturization development. The dimensional accuracy of the optical component has been toward the development of sub-micron, a micro-injection molding of a micro-structured optical component can be used in the pesticide residue, the water quality, air quality and detecting ultraviolet density. Optical applications can be used in a color matching and management, reflection measurements, and biomedical measurement.

The optical component is usually made of high molecular plastic material because the polymer plastic material has a relatively low cost, wide application of mechanical properties, higher process ability, and a plurality of communication devices and medical devices, which the material are gradually being substituted by polymeric plastic materials. The micro-spectrometer is gradually directed to the applications, such as the smaller size and higher efficiency, where the core technology of the micro-spectrometer is a reflective optical component to provide the functions of focusing and dispersion. The method of manufacturing an optical component in the various aforementioned applications is originally performed by a deep reactive ion etching (DRIE) process of the micro-electro-mechanical systems (MEMS), or by a wet etching method of a semiconductor process. However, the cost is relatively high and also limited to the area size of the optical component. In other words, it is difficult to manufacture a large-area optical component and therefore there is a need to provide a novel method of manufacturing an optical component and make it meet working temperature requirements when forming a reflective film to solve the above-mentioned problems.

SUMMARY OF THE INVENTION

Therefore, one objective of the present invention is to provide a method for manufacturing an optical component having micro-structures for detecting the crystallization temperature and the crystallization temperature interval including the crystallization temperature so that the molding material is filled into the mold cavity to effectively produce the optical component having micro-structures in a large area.

An objective of the present invention is to provide a method for manufacturing an optical component having micro-structures for detecting the crystallization temperature and the crystallization temperature interval including the crystallization temperature so that the molding material is filled into the mold cavity to quickly produce the optical component having micro-structures in the large area.

An objective of the present invention is to provide a method for manufacturing an optical component having micro-structures by selecting an appropriate liquid crystal polymer according to requirements of a melting temperature, so as to meet working temperature requirements during a subsequent reflective film coating, and to avoid melting and deformation of the liquid crystal polymer caused by an excessively high working temperature during the reflective film coating.

Based on the above objective, the present invention sets forth a method of manufacturing an optical component having micro-structures. The method of manufacturing an optical component having micro-structures applicable to an injection molding device of the optical component having micro-structures, wherein the optical component having micro-structure is a reflective optical component with a reflective film, and the injection molding device comprises a stationary structure, a fixed side mold, a movable structure having a movable side mold, a pressure sensor, and a piezoelectric actuator, and wherein the movable side mold is disposed opposite to the fixed side mold, the method comprising the steps of:

(a) forming a mold cavity between the fixed side mold and the movable side mold when the stationary structure and the movable structure are closed and locked;

(b) injecting a molding material into the mold cavity of a side edge to fill the molding material to the mold cavity, and performing, by the movable side mold, an injection step of the molding material;

(c) sensing, by a pressure sensor, a pressure of the mold cavity, and outputting a pressure sensing signal;

(d) sensing, by a temperature sensor, a process temperature of the molding material in the mold cavity, and outputting a temperature sensing signal corresponding to the process temperature;

(e) when the pressure sensing signal is smaller than a peak pressure of the mold cavity, and when a temperature sensing signal of a solidified layer on a surface of the molding material is within a crystallization temperature interval of the molding material, reciprocating, by the piezoelectric actuator, to push the movable side mold so that the movable side mold performs a reciprocating vibration motion along a predetermined direction, wherein during a filling stage of the step (a) through the step (e), the molding material is filled into the mold cavity to form the optical component having micro-structures; and (f) forming the reflective film on a micro-structure surface of the optical component having a micro-structure by chemical vapor deposition (CVD) or physical vapor deposition (PVD), like sputtering;

wherein the crystallization temperature interval is defined as a temperature interval including a crystallization temperature of the molding material, a surface of the solidified layer is adjacent to a wall of the mold cavity, and the surface of the solidified layer is formed according to the crystallization temperature interval when the molding material contacts the mold wall of the mold cavity to generate an instantaneous heat exchange state.

In one embodiment, when the temperature sensing signal is within the crystallization temperature interval of the molding material, a viscosity of the molding material is between 50 to 200 g/cm·sec, a volume shrinkage rate of the molding material has a range from 0.5 to 0.8 ml/g, and the molding material has a thermal expansion coefficient of the molding material that is greater than zero and less than 0.00001.

In one embodiment, the molding material is liquid crystalline polymer (LCP) material.

In one embodiment, a melting temperature of the LCP material ranges from 200° C. to 400° C.

In one embodiment, a sputtering temperature of the reflective film ranges from 60° C. to 100° C.

In one embodiment, the crystallization temperature interval is greater than 50° C. and less than or equal to 380° C., and the crystallization temperature is a temperature value of the crystallization temperature interval.

In one embodiment, the crystallization temperature is in the temperature range from 200° C. to 350° C.

In one embodiment, the temperature sensing signal of the molding material is within the crystallization temperature interval, and based on a viscosity, a volume shrinkage rate, a thermal expansion coefficient, and the combinations of the molding material, a micro-structure pitch of the optical component is greater than zero and less than or equal to 30 microns.

In one embodiment, the micro-structure pitch of the optical component is greater than 5 nm and less than or equal to 5 microns.

In one embodiment, the temperature sensing signal in the molding material is within the crystallization temperature interval, and based on a viscosity, a volume shrinkage rate, a thermal expansion coefficient, and the combinations of the molding material, a micro-structure width of the optical component is greater than zero and less than or equal to 30 microns.

In one embodiment, the micro-structure width of the optical component is greater than 5 nm and less than or equal to 5 microns.

In one embodiment, the temperature sensing signal in the molding material is within the crystallization temperature interval, and based on a viscosity, a volume shrinkage rate, a thermal expansion coefficient, and the combinations of the molding material, a micro-structure depth of the optical component is greater than zero and less than or equal to 10 microns.

In one embodiment, the micro-structure depth of the optical component is greater than 0.01 nm and less than or equal to one micron.

In one embodiment, the temperature sensing signal in the molding material is within the crystallization temperature interval, and based on a viscosity, a volume shrinkage rate, a thermal expansion coefficient, and the combinations of the molding material, the ratio of micro-structure pitch and the total width of the optical component is between 1:50 to 1:50000.

In one embodiment, the temperature sensing signal in the molding material is within the crystallization temperature interval, and based on a viscosity, a volume shrinkage rate, a thermal expansion coefficient, and the combinations of the molding material, the ratio of micro-structure depth and the total thickness of the optical component is between 1:90 to 1:90000.

In one embodiment, the temperature sensing signal in the molding material is within the crystallization temperature interval, and based on a viscosity, a volume shrinkage rate, a thermal expansion coefficient, and the combinations of the molding material, a micro-structure pitch of the optical component is equal to or smaller than 10 times the optical wavelength which is incident to the optical component.

In one embodiment, the optical wavelength is between 100 nm and 1500 nm.

BRIEF DESCRIPTION OF THE DRAWINGS

The following embodiments refer to the accompanying drawings for exemplifying specific implementable embodiments of the present invention.

DETAILED DESCRIPTION OF THE PREFERRED EMBODIMENTS

Figure 1:
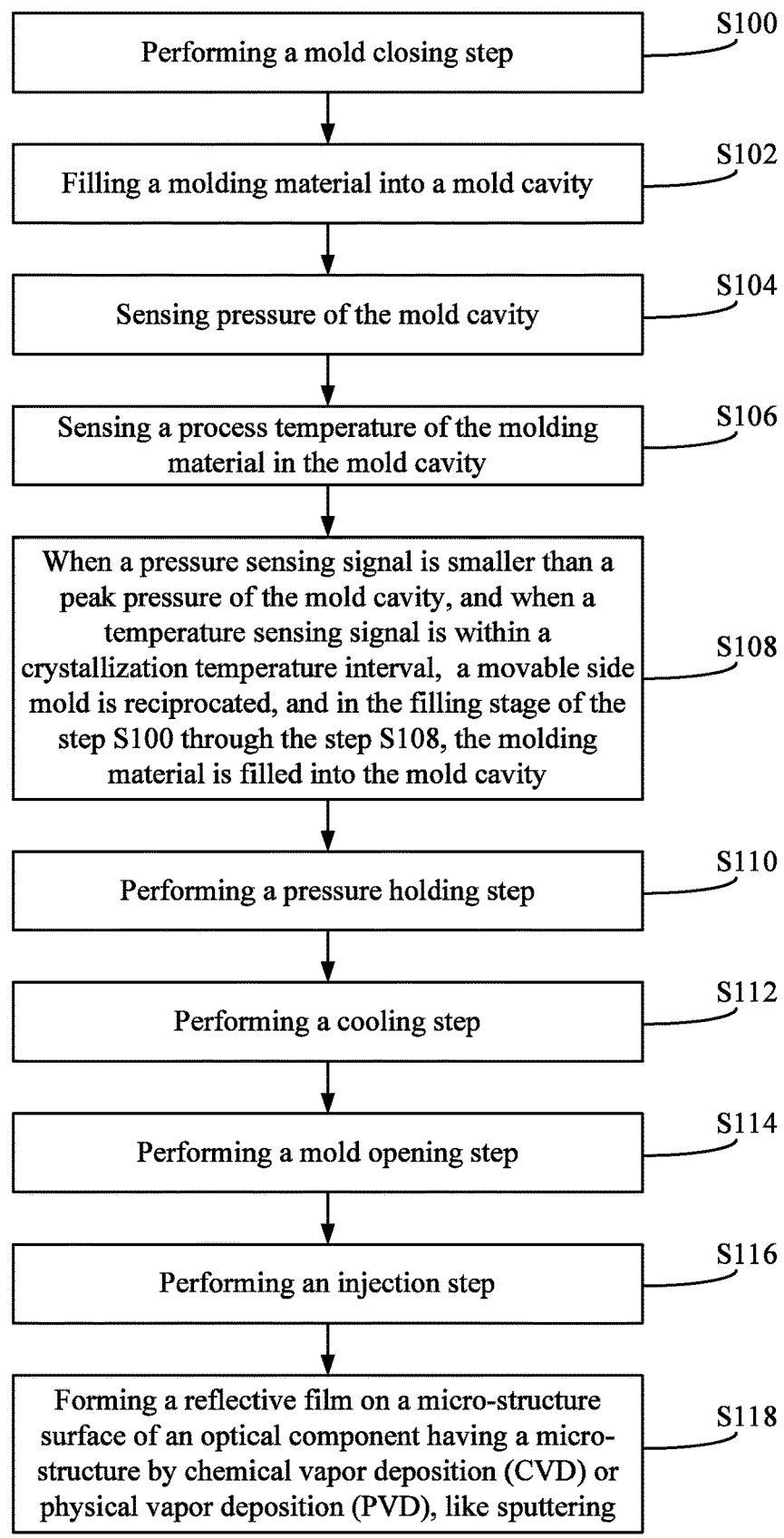
FIG. 1 is a flowchart of a method for manufacturing an optical component having micro-structures according to one embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Figure 2:
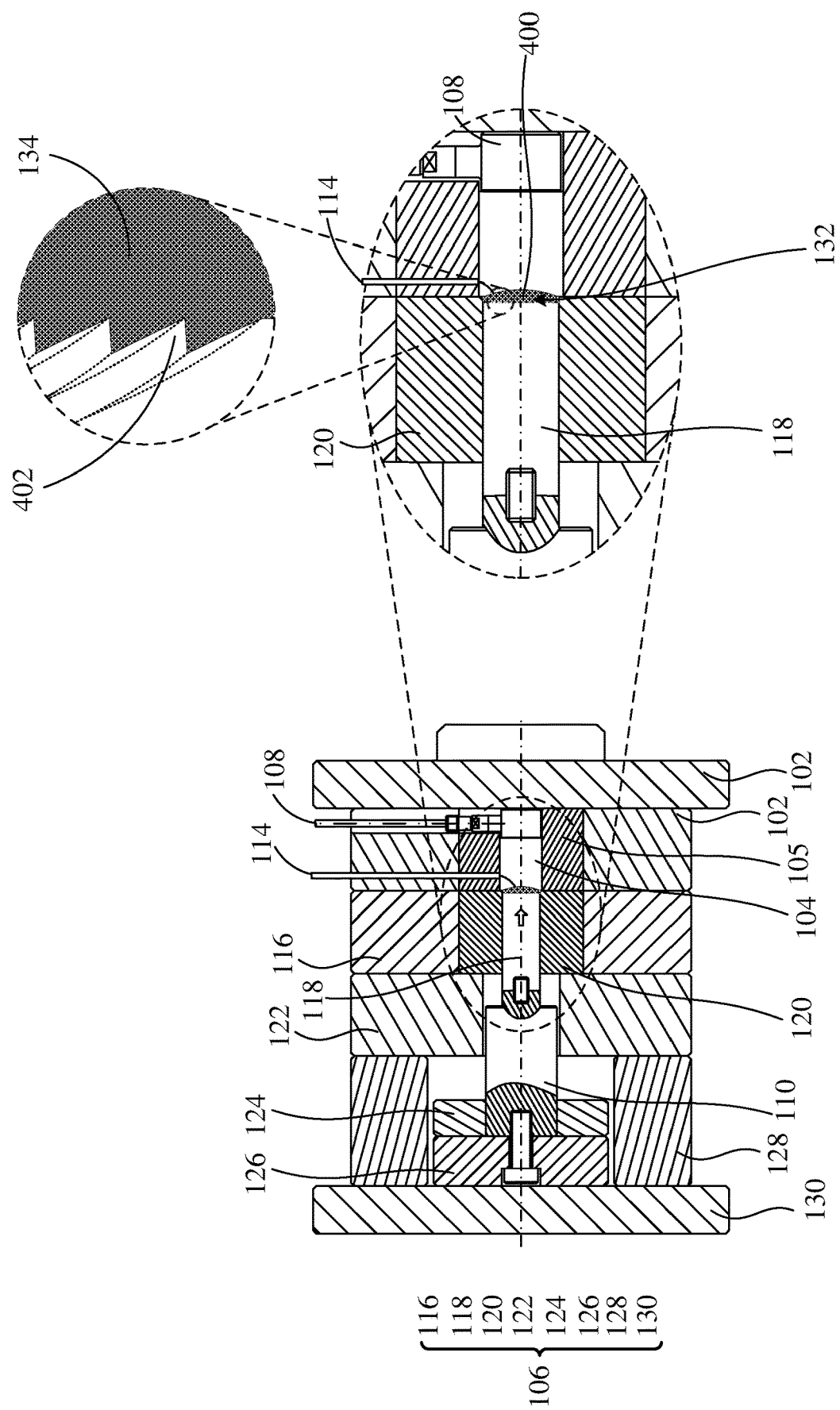
FIG. 2 is an illustrative cross-sectional view of an injection molding device of an optical component having micro-structures according to one embodiment of the present invention.

FIG. 1 is a flowchart of a method for manufacturing an optical component (shown in FIG. 4) 400 having micro-structures according to one embodiment of the present invention. FIG. 2 is an illustrative cross-sectional view of an injection molding device of an optical component 400 having micro-structures according to one embodiment of the present invention. In one embodiment, the injection molding device in FIG. 2 is for performing the method for manufacturing an optical component 400 having micro-structures. The optical component 400 having micro-structure is a reflective optical component with a reflective film 500. The injection molding device includes a stationary structure 102, a fixed side mold 104, a fixed side module 105, a movable structure 106, a pressure sensor 108, a piezoelectric actuator 110 and a temperature sensor 114. The movable structure 106 includes a first support plate 116, a movable side mold 118, a movable-side module 120, a second support plate 122, a first ejection plate 124, a second ejector plate 126, a first mold base 128 and a second mold base 130. The movable side mold 118 and the fixed side mold 104 are oppositely arranged to form a mold cavity 132. As shown in FIG. 1, the method for manufacturing an optical component 400 having micro-structures includes the following steps.

In the step S100, a mold closing step is performed so that the fixing structure 102 and the movable structure 106 approaches and fit together. In other words, when the stationary structure 102 and the movable structure 106 are closed and locked, the fixed side mold 104 and the movable side mold 118 forms the mold cavity 132.

In the step S102, a molding material 134 is injected into the mold cavity 132 of the side edge (not shown) to fill the molding material 134 to the mold cavity 132, and the movable side mold 118 performs an injection step of the molding material 134. In other words, after the fixed side mold 104 and the movable side 118 are closed and locked, the movable side mold 118 performs the injection step of the molding material 134 to fill a molding material 134 to the mold cavity 132. Person skilled in the art should be noted that the injection step is, for example, is performed by an injection screw to inject the molding material 134 into the mold cavity 132. In one embodiment, the molding material 134 is a material of liquid crystalline polymer (LCP), and a melting temperature of the LCP material ranges from 200° C. to 400° C.

In the step S104, a pressure sensor 108 senses the pressure of the mold cavity 132, and outputs a pressure sensing signal.

In the step S106, a temperature sensor 114 senses a process temperature of the molding material 134 in the mold cavity 132, and outputs a temperature sensing signal corresponding to the process temperature. In one embodiment, the temperature sensor 114 is disposed within the stationary structure 102, to sense the process temperature of the molding material 134 in the mold cavity 132.

In the step S108, when the pressure sensing signal is smaller than a peak pressure PM of the mold cavity 132, and when a temperature sensing signal of a solidified layer on the surface of the molding material 134 is within the crystallization temperature interval TCI of the molding material 134, the piezoelectric actuator 110 reciprocates to push the movable side mold 118 so that the movable side mold 118 performs a reciprocating vibration motion along a predetermined direction. In the filling stage of the step S100 through the step S108, the molding material 134 is filled into the mold cavity 132 to form the optical component 400 having a micro-structure, where the crystallization temperature interval TCI is defined as a temperature interval including a crystallization temperature $T_c$ of the molding material 134. The surface of the solidified layer is adjacent to the mold wall of the mold cavity 132. The surface of the solidified layer is formed according to the crystallization temperature interval TCI when the molding material 134 contacts the mold wall of the mold cavity 132 to generate an instantaneous heat exchange state. In one embodiment, the peak pressure is a pressure value of the filling stage in the step S100 through the step S108.

In the step S110, the pressure holding step is performed. It should be noted that the pressure holding means a predetermined pressure after the stationary structure 102 and the movable structure 106 are closed. Meanwhile, after the molding material 134 is filled into the mold cavity 132, the injection screw continuously injects the molding material 134 into the mold cavity 132 by using the predetermined pressure to compensate the volume shrinkage of the molding material 134 in the mold cavity 132.

In the step S112, a cooling step is performed, so that the optical component 400 is cooled.

In the step S114, a mold opening step is performed, so that the stationary structure 102 and the movable structure 106 separate.

Figure 4:
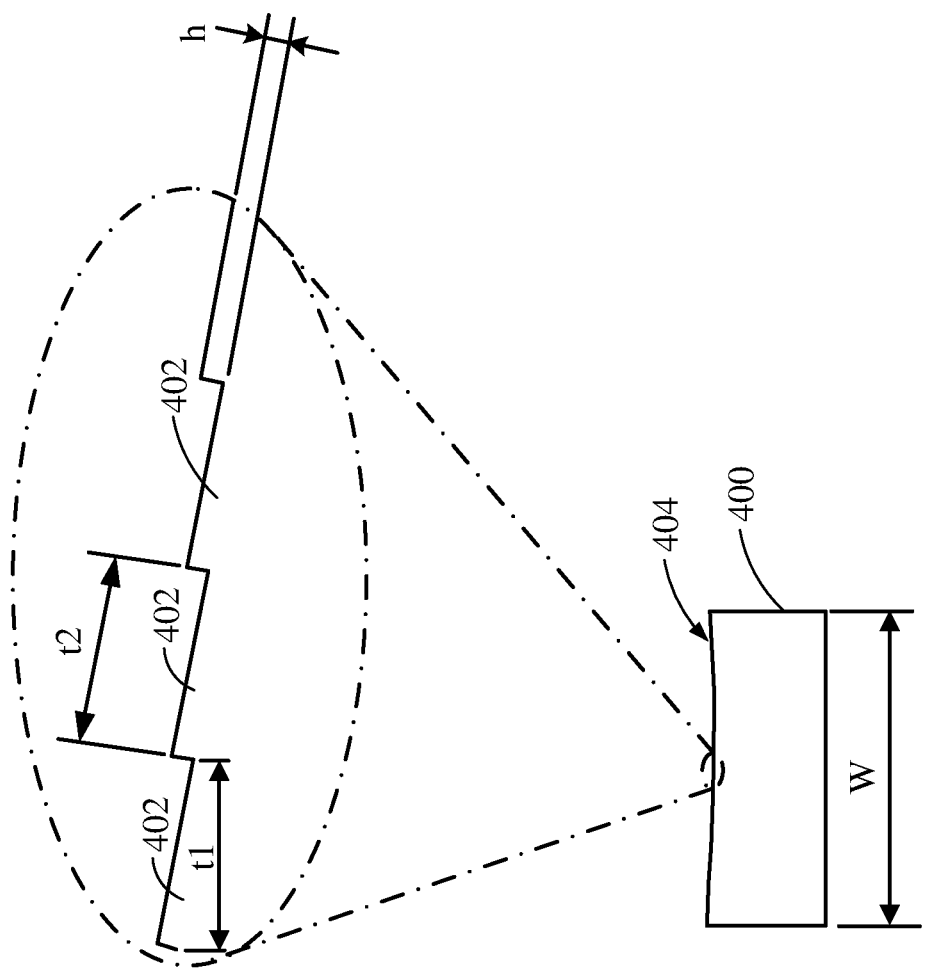
FIG. 4 is an illustrative view of an optical component having micro-structures according to one embodiment of the present invention.

In the step S116, an ejection step is performed to remove the optical component 400 by ejecting the optical component 400 (as shown in FIG. 4).

In the step S118, forming the reflective film 500 on a micro-structure surface 406 of the optical component 400 having a micro-structure by chemical vapor deposition (CVD) or physical vapor deposition (PVD), like sputtering.

Figure 3:
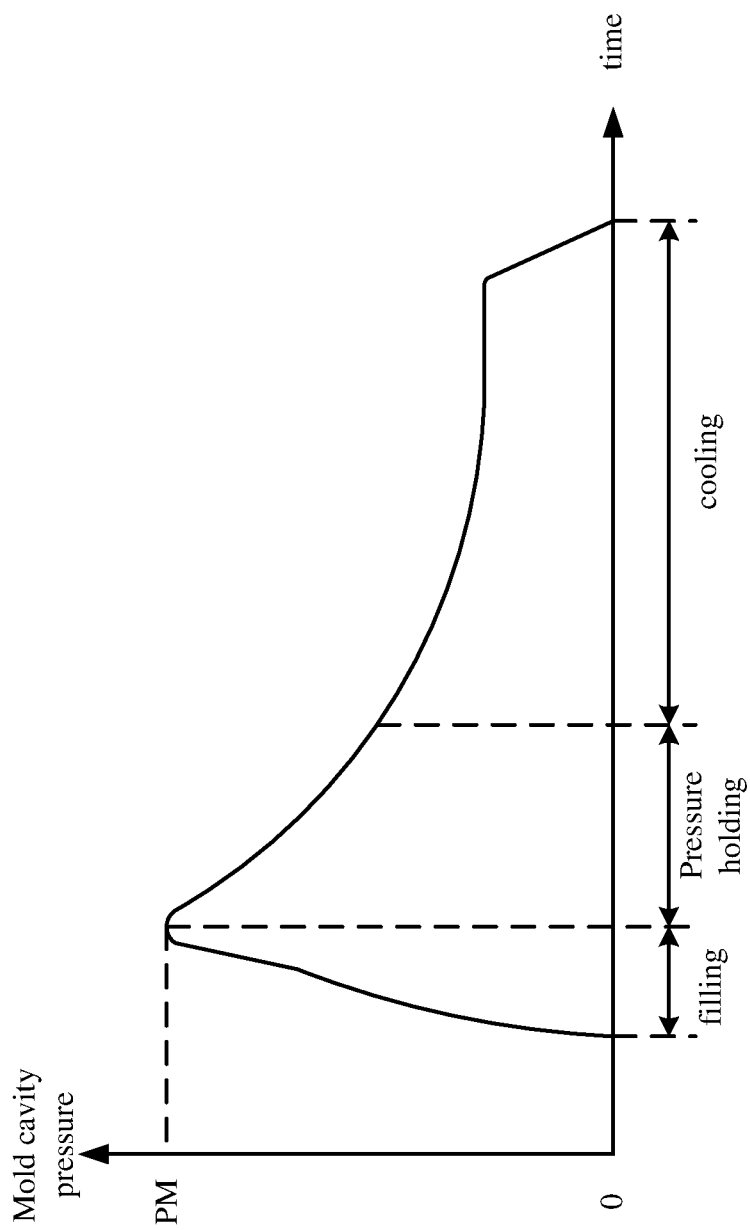
FIG. 3 is an illustrative diagram of a corresponding relation curve between a cavity pressure and a molding time according to one embodiment of the present invention.

FIG. 3 is an illustrative diagram of a corresponding relation curve between a cavity pressure and a molding time according to one embodiment of the present invention. The horizontal axis of the corresponding relation curve 300 represents time and the vertical axis represents the pressure in the mold cavity, which includes a pressure change curve of the three stages of the filling, pressure holding and cooling. In the injection molding device of the optical component 400 having micro-structures of the present invention, a reciprocating vibration procedure and heating operation are performed on the molding material during the filling step, where the reciprocating vibration procedure facilitates the flow of the molding material and the heating operation can maintain the molding material in a semi-solidified state. In a method for manufacturing an optical component having micro-structures according to one embodiment of the present invention, the reciprocating vibration procedure and heating operation are performed in the filling step. In different embodiments, depending on the size of the optical component 400, the geometry, the micro-structural complexity, different pressure intervals can be selected and is not limited to the above conditions.

FIG. 4 is an illustrative view of an optical component 400 having micro-structures according to one embodiment of the present invention. In one embodiment, the optical component 400 having micro-structures of the present invention is a grating element, such as a reflective optical element (ROE), ash own in FIG. 4, but is not limited. In one embodiment, the microstructures 402 are disposed on the free curved surface 404 of the optical component 400.

Figure 6:
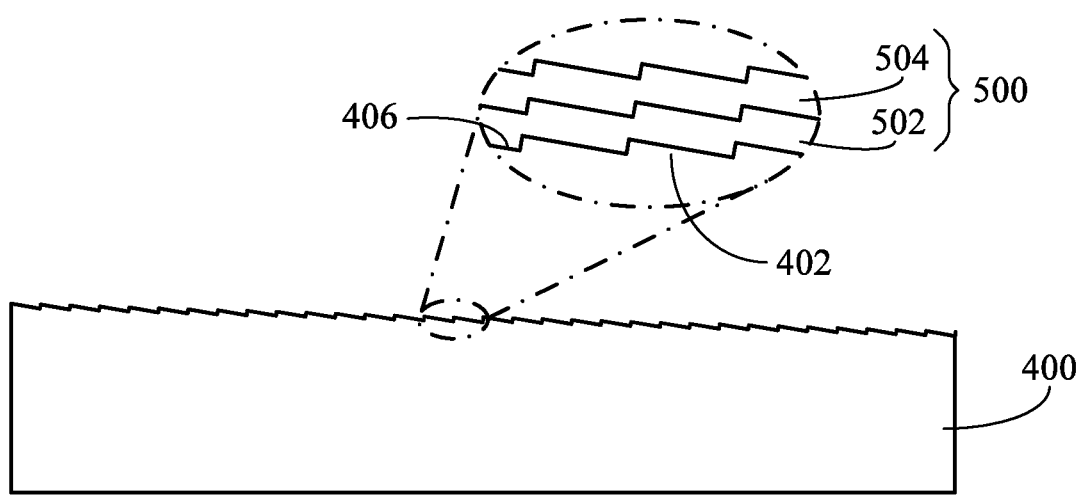
FIG. 6 is an illustrative diagram of a reflective film of the optical component having micro-structures according to one embodiment of the present invention.

As shown in FIG. 6, the microstructure 402 comprises the micro-structure surface 406, and the reflective film 500 is formed on the micro-structure surface 406 by sputtering. The reflective film 500 comprises an aluminum (Al) film 502 and a silicon dioxide ($SiO_2$) film 504. The sputtering steps are: first sputtering the Al film 502 on the micro-structure surface 404, and then sputtering the $SiO_2$ film 504 on the Al film 502. A thickness of the Al film 502 and the $SiO_2$ film 504 ranges from 10 nm to 40 nm, and a sputtering temperature of the reflective film ranges from 60° C. to 100° C.

In one embodiment, the temperature sensing signal of the molding material 134 is within the crystallization temperature interval TCI. Based on the viscosity, the volume shrinkage rate, the thermal expansion coefficient, and the combinations of the molding material 134, the micro-structure pitch t1 of the optical component 400 is greater than zero and less than or equal to 30 microns. Preferably, the micro-structure pitch t1 of the optical component 400 is greater than 5 nm and less than or equal to 5 microns.

In one embodiment, the temperature sensing signal in the molding material 134 is within the crystallization temperature interval TCI. Based on the viscosity, the volume shrinkage rate, the thermal expansion coefficient, and the combinations of the molding material 134, the micro-structure width t2 of the optical component 400 is greater than zero and less than or equal to 30 microns. Preferably, the microstructure width t2 of the optical component 400 is greater than 5 nm and less than or equal to 5 microns.

In one embodiment, the temperature sensing signal in the molding material 134 is within the crystallization temperature interval TCI. Based on the viscosity, the volume shrinkage rate, the thermal expansion coefficient, and the combinations of the molding material 134, the micro-structure depth h of the optical component 400 is greater than zero and less than or equal to 10 microns. Preferably, the microstructure depth h of the optical component 400 is greater than 0.01 nm and less than or equal to one micron.

In one embodiment, the temperature sensing signal in the molding material 134 is within the crystallization temperature interval TCI. Based on the viscosity, the volume shrinkage rate, the thermal expansion coefficient, and the combinations of the molding material 134, the ratio of microstructure pitch t1 and the width W of the optical component 400 is between 1:50 to 1:50000.

In one embodiment, the temperature sensing signal in the molding material 134 is within the crystallization temperature interval TCI. Based on the viscosity, the volume shrinkage rate, the thermal expansion coefficient, and the combinations of the molding material 134, the ratio of microstructure depth h and the thickness H of the optical component 400 is between 1:90 to 1:90000.

In one embodiment, the temperature sensing signal in the molding material 134 is within the crystallization temperature interval TCI. Based on the viscosity, the volume shrinkage rate, the thermal expansion coefficient, and the combinations of the molding material 134, the micro-structure pitch t1 of the optical component 400 is equal to or smaller than 10 times the optical wavelength which is incident to the optical component 400, where the optical wavelength is, for example, between 100 nm and 1500 nm so that the optical component 400 forms a preferred diffraction spectrum distribution curve.

The method for manufacturing an optical component having micro-structures according to one embodiment of the present invention controls the crystallization temperature $T_c$ and the crystallization temperature interval TCI including the crystallization temperature $T_c$ so that the molding material 134 is filled into the mold cavity 132 to quickly produce the optical component 400 having micro-structures in a large area, where the product of the width and W and length of the optical component 400 is defined as the area of the optical component 400. Furthermore, the temperature sensing signal in the molding material 134 is within the crystallization temperature interval TCI, and based on the viscosity, the volume shrinkage rate, the thermal expansion coefficient, and the combinations of the molding material 134, the micro-structure pitch, width and depth dimensions of the optical component 400 are more shrunk advantageously.

Figure 5A:
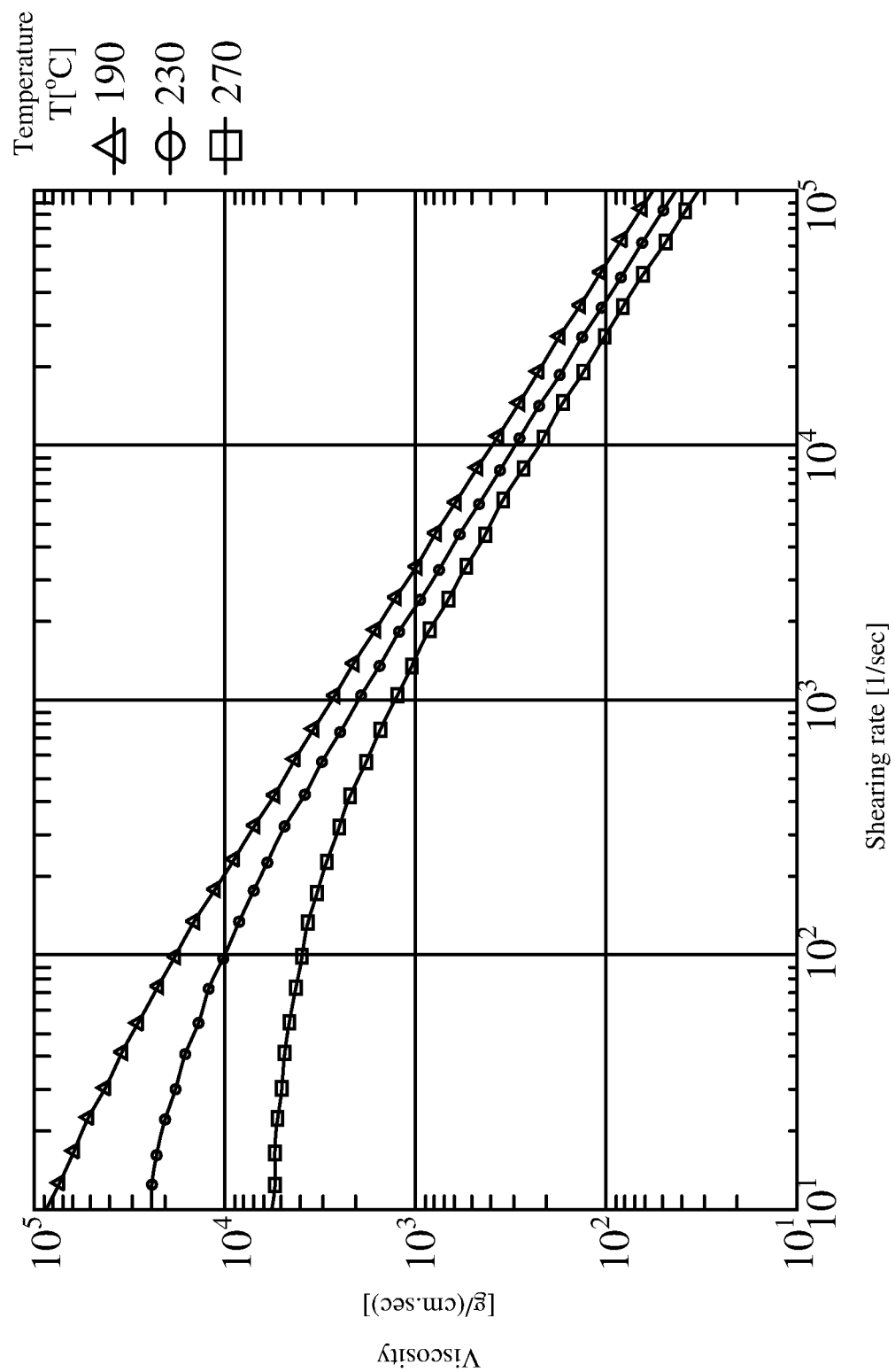
FIG. 5A is an illustrative relation curve of a molding material viscosity according to one embodiment of the present invention.

FIG. 5A is an illustrative relation curve of a molding material viscosity according to one embodiment of the present invention. The horizontal axis represents a shearing rate in a unit of 1/second (1/s), and the vertical axis represents a viscosity property, in a unit of gram/cm·sec (g/(cm·sec)). As shown in FIG. 5A, in an injection molding process, the molding material 134 such as an LCP material has a shearing rate which is greater than $10^4$ (1/s) and corresponds to a viscosity of, for example, 200 g/cm·sec. In one embodiment, when the temperature sensing signal is within the crystallization temperature interval TCI of the molding material 134, the viscosity of the molding material 134 is between 50 to 200 g/cm·sec. As shown in FIG. 5A, the LCP material has a relatively low viscosity (i.e., better flowability) during the forming process so as to effectively improve the forming reproduction quality of the optical component 400 having the microstructure 402.

Figure 5B:
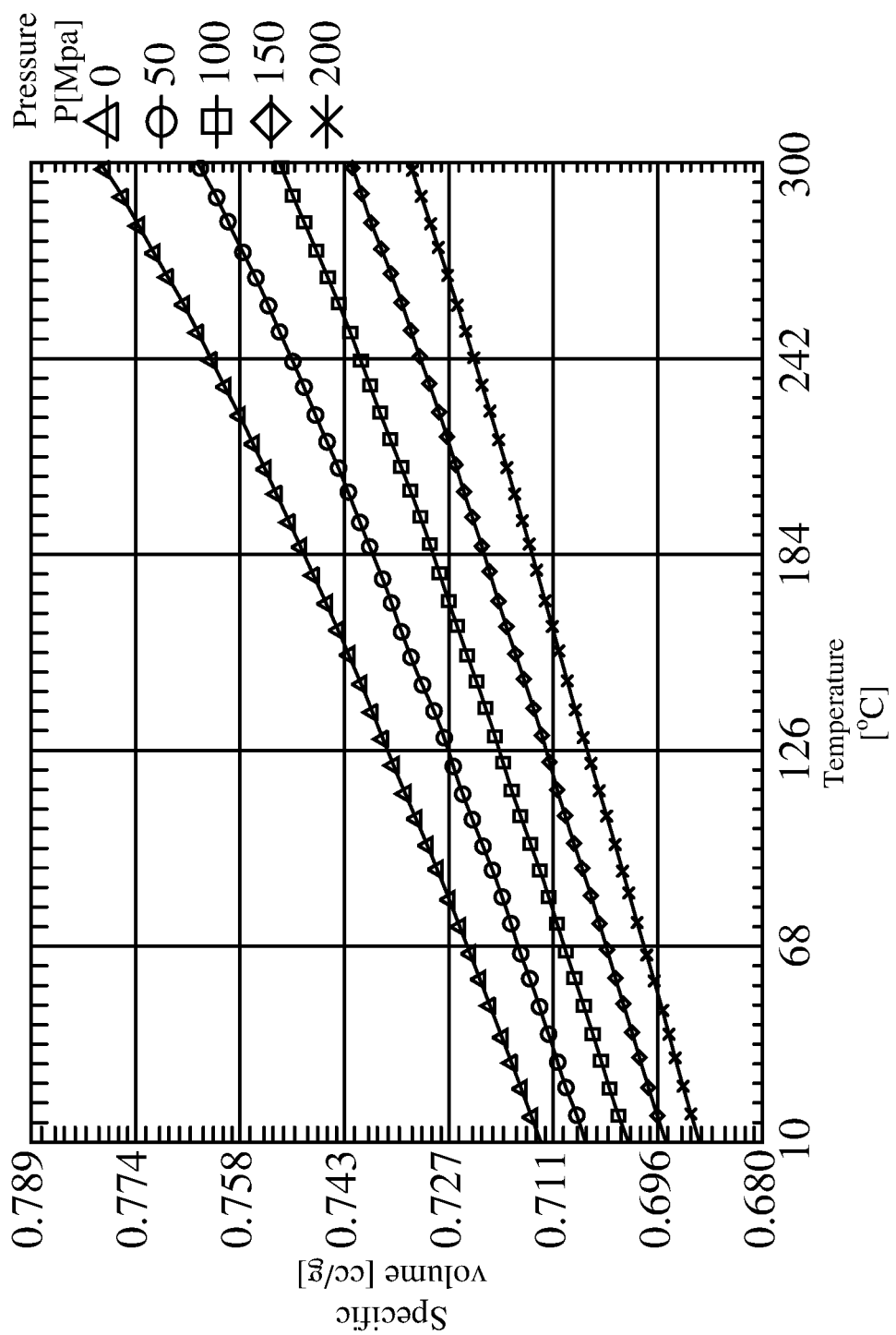
FIG. 5B is an illustrative relation curve of a volume shrinkage rate of the molding material according to one embodiment of the present invention.

FIG. 5B is an illustrative relation curve of a volume shrinkage rate of the molding material 134 according to one embodiment of the present invention. The horizontal axis represents the temperature in units of degrees Celsius (° C.), and the vertical axis represents the specific volume in units of ml/g (cc/g). As shown in FIG. 5B, the volume shrinkage is represented by the pressure, the specific volume, and the temperature of the molding material 134, such as a LCP material. When the molding material 134 is cooled from a high-temperature molten state to a room temperature cured state, the molding material 134 has a relatively low specific volume change. In other words, when the LCP material of the molding material is molded, the optical component 400 having micro-structures such as a grating assembly has a relatively small volume shrinkage and better molding quality. In one embodiment, when the temperature sensing signal of the molding material 134 (e.g., LCP material) is within the crystallization temperature interval TCI, the volume shrinkage rate of the molding material 134 has a range from 0.5 to 0.8 ml/g (cc/g).

In addition, since the optical component 400 is controlled by the temperature effect is more obvious, and when the temperature sensing signal of the molding material 134 (e.g., LCP material) is within the crystallization temperature interval TCI, the molding material 134 has a thermal expansion coefficient of the molding material 134 (e.g., LCP material) that is greater than zero and less than 0.00001 and the molding material 134 has a small thermal expansion coefficient. In other words, when the optical component 400 having micro-structures, such as a grating assembly, is produced, the temperature effect of the grating assembly can be reduced in view of heat influence.

Figure 5C:
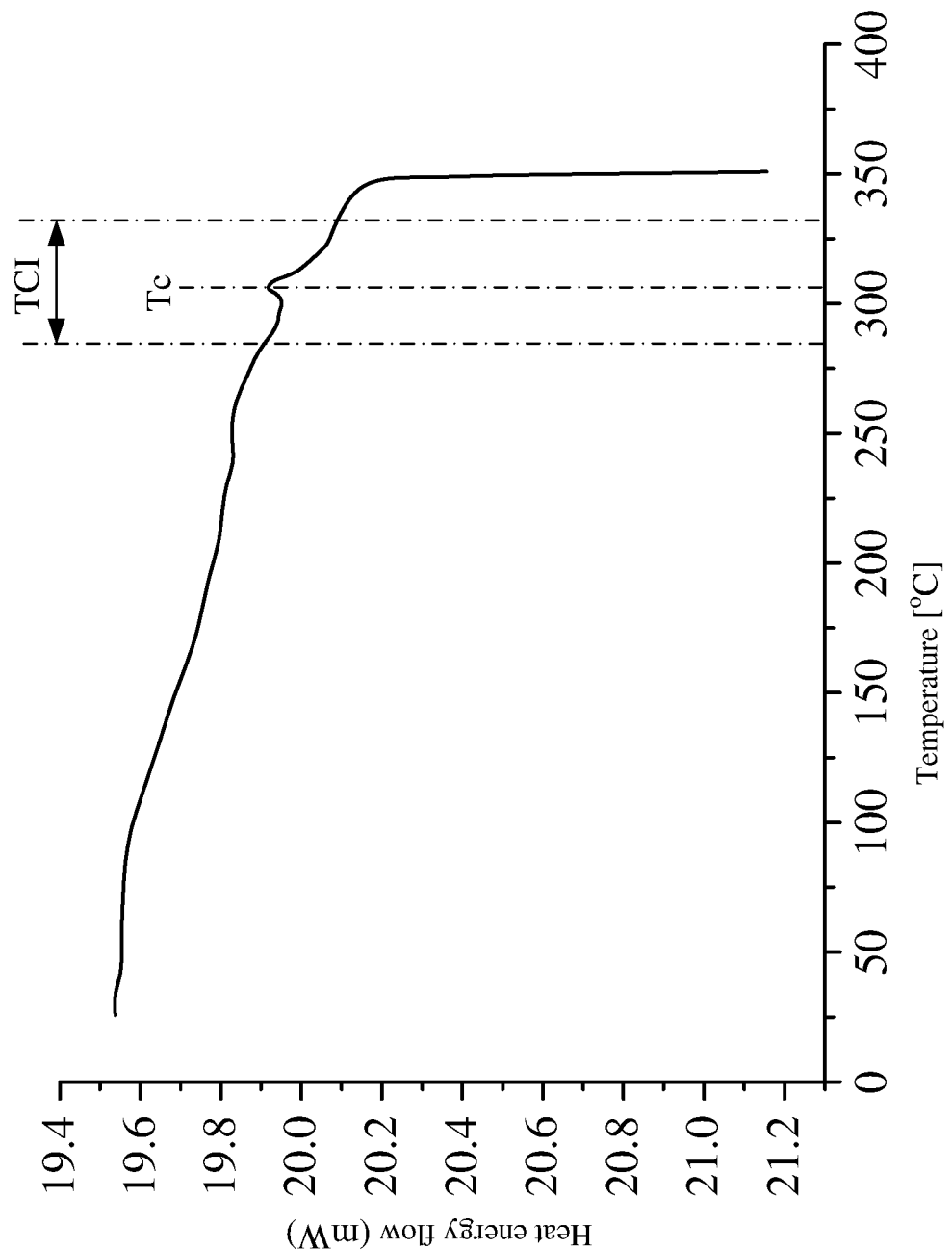
FIGS. 5C-5D are illustrative relation curves of a crystallization temperature interval of the molding material according to one embodiment of the present invention.
Figure 5D:
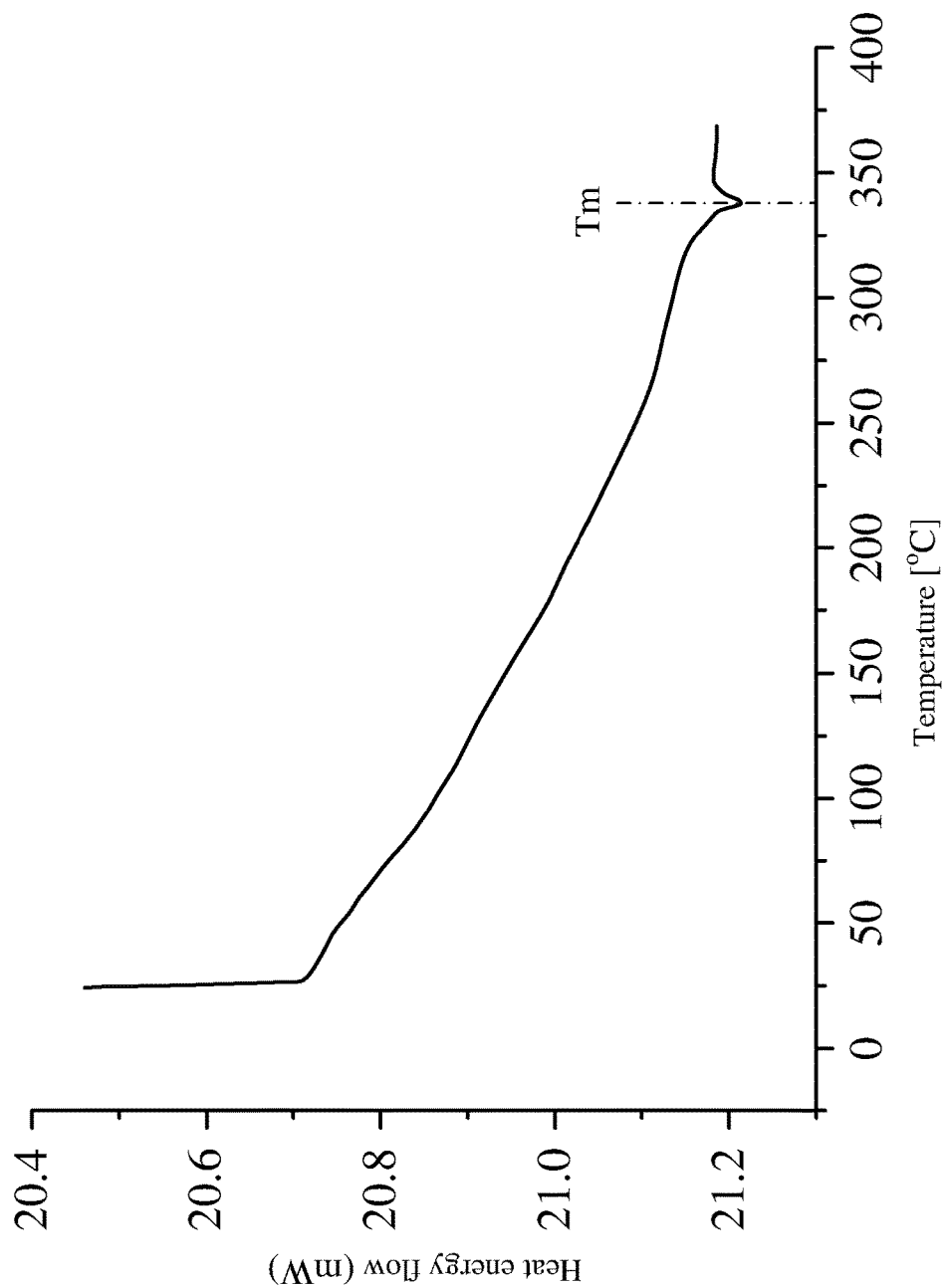

FIGS. 5C-5D are illustrative relation curves of a crystallization temperature interval of the molding material according to one embodiment of the present invention. The horizontal axis represents the temperature in units of degrees Celsius (° C.), and the vertical axis represents the flow of heat energy (e.g., power), with units of micro watts (mW). FIG. 5C depicts a relation curve of a crystallization temperature interval of the molding material (e.g., LCP material), where the crystallization temperature $T_c$ is, for example, 306.35° C. FIG. 5D depicts a relation curve of a melting temperature of the molding material (e.g., LCP material), where the melting temperature $T_m$ is, for example, 337.41° C. In one embodiment, the relation curves in FIGS. 5C-5D are depicted by measuring a energy variation when a differential scanning calorimeter (DSC) detects the energy during a temperature change, for example, from a molten state to a solidified state where the energy variation corresponds to the exothermic state of the LCP material in the crystallization temperature $T_c$.

In one embodiment, the crystallization temperature interval TCI is greater than 50° C. and less than or equal to 380° C., the crystallization temperature $T_c$ is a temperature value of the crystallization temperature interval TCI. In one embodiment, the crystallization temperature $T_c$ is preferably in the temperature range from 200 degrees Celsius to 350 degrees Celsius. As shown in FIG. 5C, the crystallization temperature interval TCI of the LCP material is greater than 286 degrees Celsius and less than or equal to 326 degrees Celsius. For example, the crystallization temperature $T_c$ is any temperature value (e.g., 306.35° C.) of the crystallization temperature interval TCI. The molding material (e.g., LCP material) is performed by micro-vibration within the crystallization temperature interval to easily fill the LCP material into the mold cavity to form the micro-structure.

According to FIGS. 5A-5D, the method for manufacturing an optical component having micro-structures according to at least one embodiment of the present invention detects the crystallization temperature $T_c$ and the crystallization temperature interval TCI including the crystallization temperature $T_c$ to control the viscosity, the volume shrinkage rate, and the thermal expansion coefficient of the molding material (e.g., LCP material) so that the molding material 134 is filled into the mold cavity 132 to quickly produce the optical component 400 having micro-structures in a large area.

In summary, the method for manufacturing an optical component having micro-structures according to at least one embodiment of the present invention detects the crystallization temperature and the crystallization temperature interval including the crystallization temperature so that the molding material is filled into the mold cavity to effectively and quickly produce the optical component having micro-structures in a large area. In addition, the present invention selects an appropriate liquid crystal polymer according to requirements of the melting temperature to meet working temperature requirements during the subsequent reflective film coating, and to avoid melting and deformation of the liquid crystal polymer caused by an excessively high working temperature during the reflective film coating.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A method of manufacturing an optical component having micro-structures applicable to an injection molding device of the optical component having micro-structures, wherein the optical component having micro-structure is a reflective optical component with a reflective film, and the injection molding device comprises a stationary structure, a fixed side mold, a movable structure having a movable side mold, a pressure sensor, and a piezoelectric actuator, and wherein the movable side mold is disposed opposite to the fixed side mold, the method comprising the steps of:
    (a) forming a mold cavity between the fixed side mold and the movable side mold when the stationary structure and the movable structure are closed and locked;
    (b) injecting a molding material into the mold cavity of a side edge to fill the molding material to the mold cavity, and performing, by the movable side mold, an injection step of the molding material, wherein the molding material is liquid crystalline polymer (LCP) material;
    (c) sensing, by a pressure sensor, a pressure of the mold cavity, and outputting a pressure sensing signal;
    (d) sensing, by a temperature sensor, a process temperature of the molding material in the mold cavity, and outputting a temperature sensing signal corresponding to the process temperature;
    (e) when the pressure sensing signal is smaller than a peak pressure of the mold cavity, and when a temperature sensing signal of a solidified layer on a surface of the molding material is within a crystallization temperature interval of the molding material, reciprocating, by the piezoelectric actuator, to push the movable side mold so that the movable side mold performs a reciprocating vibration motion along a predetermined direction, wherein during a filling stage of the step (a) through the step (e), the molding material is filled into the mold cavity to form the optical component having micro-structures, and
    (f) forming the reflective film on a micro-structure surface of the optical component having a micro-structure by chemical vapor deposition (CVD) or physical vapor deposition (PVD), wherein the reflective film is composed of an aluminum film and a silicon dioxide film;
    wherein the crystallization temperature interval is defined as a temperature interval including a crystallization temperature of the molding material, a surface of the solidified layer is adjacent to a wall of the mold cavity, and the surface of the solidified layer is formed according to the crystallization temperature interval when the molding material contacts the mold wall of the mold cavity to generate an instantaneous heat exchange state;
    wherein the temperature sensing signal is within the crystallization temperature interval of the molding material, and based on a viscosity, a volume shrinkage rate, a thermal expansion coefficient, and the combinations of the molding material, the ratio of micro-structure depth and a thickness of the optical component is between 1:90 to 1:90000.

2. The method of manufacturing the optical component having micro-structures of claim 1, wherein when the temperature sensing signal is within the crystallization temperature interval of the molding material, the viscosity of the molding material is between 50 to 200 g/cm·sec, the volume shrinkage rate of the molding material has a range from 0.5 to 0.8 ml/g, and the molding material has the thermal expansion coefficient of the molding material that is greater than zero and less than 0.00001.

3. The method of manufacturing the optical component having micro-structures of claim 1, wherein a melting temperature of the LCP material ranges from 200° C. to 400° C.

4. The method of manufacturing the optical component having micro-structures of claim 1, wherein the crystallization temperature interval is greater than 50° C. and less than or equal to 380° C., and the crystallization temperature is a temperature value of the crystallization temperature interval.

5. The method of manufacturing the optical component having micro-structures of claim 4, wherein the crystallization temperature is in the temperature range from 200° C. to 350° C.

6. The method of manufacturing the optical component having micro-structures of claim 1, wherein the temperature sensing signal of the molding material is within the crystallization temperature interval, and based on the viscosity, the volume shrinkage rate, the thermal expansion coefficient, and the combinations of the molding material, a micro-structure pitch of the optical component is greater than zero and less than or equal to 30 microns.

7. The method of manufacturing the optical component having micro-structures of claim 6, wherein the micro-structure pitch of the optical component is greater than 5 nm and less than or equal to 5 microns.

8. The method of manufacturing the optical component having micro-structures of claim 1, wherein the temperature sensing signal in the molding material is within the crystallization temperature interval, and based on the viscosity, the volume shrinkage rate, the thermal expansion coefficient, and the combinations of the molding material, a micro-structure width of the optical component is greater than zero and less than or equal to 30 microns.

9. The method of manufacturing the optical component having micro-structures of claim 8, wherein the micro-structure width of the optical component is greater than 5 nm and less than or equal to 5 microns.

10. The method of manufacturing the optical component having micro-structures of claim 1, wherein the temperature sensing signal in the molding material is within the crystallization temperature interval, and based on the viscosity, the volume shrinkage rate, the thermal expansion coefficient, and the combinations of the molding material, a micro-structure depth of the optical component is greater than zero and less than or equal to 10 microns.

11. The method of manufacturing the optical component having micro-structures of claim 10, wherein the micro-structure depth of the optical component is greater than 0.01 nm and less than or equal to one micron.

12. The method of manufacturing the optical component having micro-structures of claim 4, wherein the temperature sensing signal in the molding material is within the crystallization temperature interval, and based on the viscosity, the volume shrinkage rate, the thermal expansion coefficient, and the combinations of the molding material, the ratio of micro-structure pitch and the width of the optical component is between 1:50 to 1:50000.

13. The method of manufacturing the optical component having micro-structures of claim 4, wherein the temperature sensing signal in the molding material is within the crystallization temperature interval, and based on the viscosity, the volume shrinkage rate, the thermal expansion coefficient, and the combinations of the molding material, a micro-structure pitch of the optical component is equal to or smaller than 10 times the optical wavelength incident to the optical component.

14. The method of manufacturing the optical component having micro-structures of claim 13, wherein the optical wavelength is between 100 nm and 1500 nm.

* * * * *